US 6,652,635 B2

(12) United States Patent
Rangaraj et al.

(10) Patent No.: US 6,652,635 B2
(45) Date of Patent: Nov. 25, 2003

(54) CYAN PHASE CHANGE INKS

(75) Inventors: Srinivasa D. Rangaraj, Tualatin, OR (US); Mark R. Parker, Portland, OR (US); Jeffrey R. Kohne, Tualatin, OR (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/120,285

(22) Filed: Apr. 10, 2002

(65) Prior Publication Data

US 2003/0079645 A1 May 1, 2003

Related U.S. Application Data

(60) Provisional application No. 60/318,205, filed on Sep. 7, 2001.

(51) Int. Cl.⁷ .......................... C09D 11/00; C08L 91/08; C08K 83/00
(52) U.S. Cl. ................... 106/31.29; 106/31.61; 106/31.43; 106/31.75; 523/160; 523/161; 524/487; 524/589
(58) Field of Search .................. 106/31.29, 31.61, 106/31.43, 31.75; 523/160, 161; 524/487, 589

(56) References Cited

U.S. PATENT DOCUMENTS

| 3,653,932 | A | 4/1972 | Berry et al. ............... 106/22 |
| 4,390,369 | A | 6/1983 | Merritt et al. ............ 106/31 |
| 4,484,948 | A | 11/1984 | Merritt et al. ............ 106/31 |
| 4,684,956 | A | 8/1987 | Ball ........................ 346/1.1 |
| 4,851,045 | A | 7/1989 | Taniguchi ................. 106/31 |
| 4,889,560 | A | 12/1989 | Jaeger et al. ............. 106/27 |
| 4,889,761 | A | 12/1989 | Titterington et al. ...... 428/195 |
| 5,006,170 | A | 4/1991 | Schwarz et al. ............ 106/20 |
| 5,151,120 | A | 9/1992 | You et al. ................. 106/27 |
| 5,221,335 | A | 6/1993 | Williams et al. ........... 106/23 A |
| 5,372,852 | A | 12/1994 | Titterington et al. ...... 427/288 |
| 5,496,879 | A | 3/1996 | Griebel et al. ............ 524/320 |
| 5,621,022 | A | 4/1997 | Jaeger et al. ............. 523/161 |
| 5,780,528 | A | 7/1998 | Titterington et al. ...... 523/161 |
| 5,919,839 | A | 7/1999 | Titterington et al. ...... 523/161 |
| 5,973,062 | A | * 10/1999 | Harris et al. ............. 524/590 |
| 6,015,847 | A | 1/2000 | Titterington et al. ...... 523/160 |
| 6,018,005 | A | * 1/2000 | Banning et al. ............ 525/457 |
| 6,028,138 | A | * 2/2000 | Hahn et al. ............... 524/590 |
| 6,048,925 | A | * 4/2000 | Titterington et al. ...... 524/590 |
| 6,057,399 | A | * 5/2000 | King et al. ................ 524/590 |
| 6,180,692 | B1 | * 1/2001 | Bridgeman et al. ......... 523/161 |
| 6,350,305 | B1 | * 2/2002 | King et al. ............... 106/31.29 |
| 2003/0061964 | A1 | * 4/2003 | Batlaw .................... 106/31.27 |

FOREIGN PATENT DOCUMENTS

| DE | 4205636 | 8/1993 |
| DE | 4205713 | 3/1996 |
| EP | 0 187 352 A2 | 7/1986 |
| EP | 0 206 286 A1 | 12/1986 |
| WO | WO 94/04619 | 3/1994 |

* cited by examiner

Primary Examiner—Mark L. Bell
Assistant Examiner—Veronica F. Faison
(74) Attorney, Agent, or Firm—Judith L. Byorick

(57) ABSTRACT

Disclosed is a phase change ink composition comprising (a) a phase change carrier, (b) a cyan colored resin or wax comprising the reaction product of (i) a cyan colorant having at least one functional group selected from (A) hydroxyl groups, (B) primary or secondary amino groups, (C) mercapto groups, or (D) mixtures thereof, and (ii) an isocyanate, and (c) an organic acid selected from (i) organic sulfonic acids, (ii) organic phosphinic acids, (iii) organic phosphonic acids, or (iv) mixtures thereof.

36 Claims, 1 Drawing Sheet

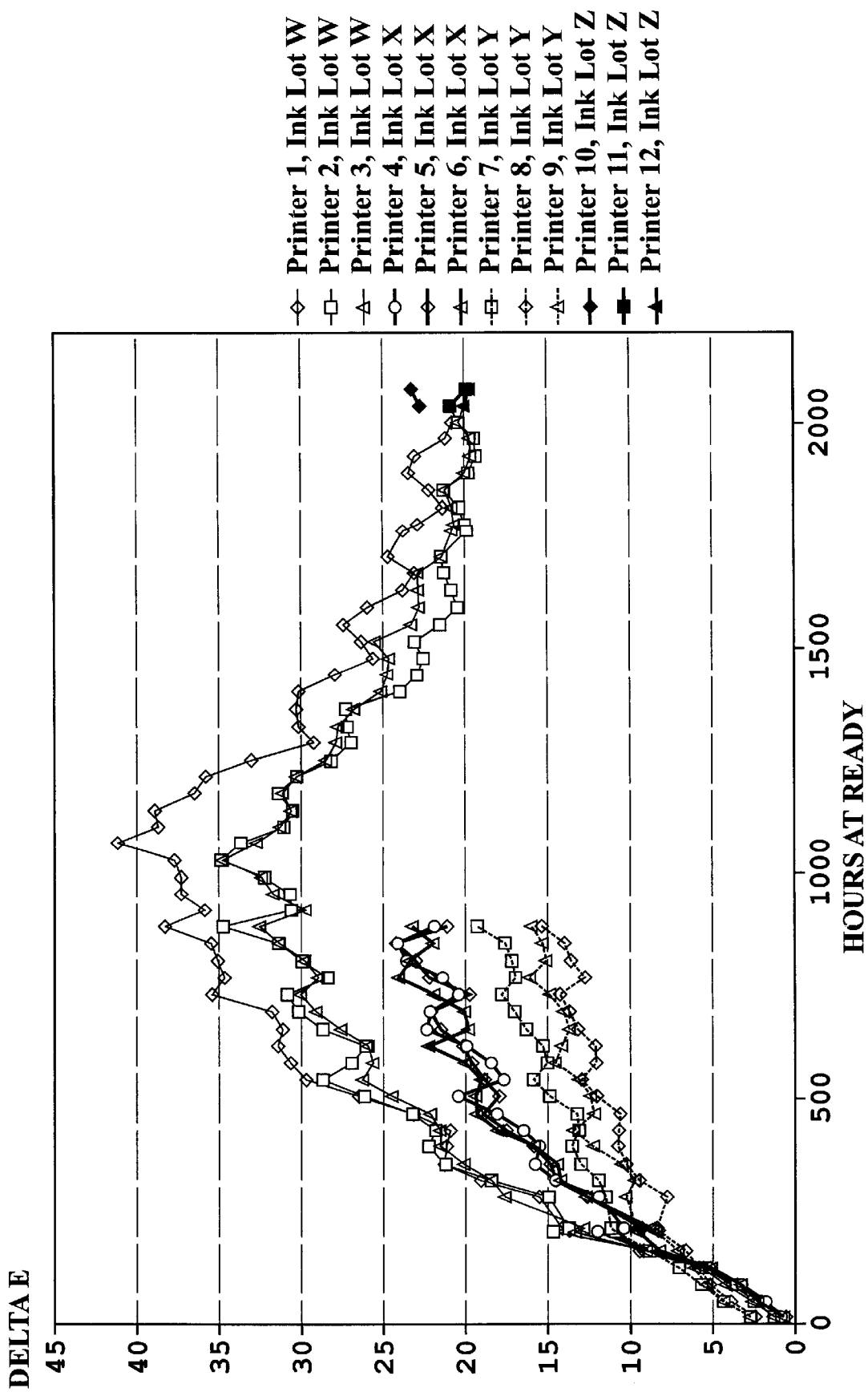

CYAN PHASE CHANGE INKS

This application is based on a Provisional Patent Application No. 60/318,205, filed Sep. 7, 2001.

BACKGROUND OF THE INVENTION

The present invention is directed to hot melt or phase change inks. More specifically, the present invention is directed to cyan phase change inks suitable for use in phase change ink jet printers. One embodiment of the present invention is directed to a phase change ink composition comprising (a) a phase change carrier, (b) a cyan colored resin or wax comprising the reaction product of (i) a cyan colorant having at least one functional group selected from (A) hydroxyl groups, (B) primary or secondary amino groups, (C) mercapto groups, or (D) mixtures thereof, and (ii) an isocyanate, and (c) an organic acid selected from (i) organic sulfonic acids, (ii) organic phosphinic acids, (iii) organic phosphonic acids, or (iv) mixtures thereof.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining the ink carrier composition with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking and industrial marking and labelling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, or the like), the droplets solidify immediately upon contact with the substrate, so that migration of ink along the printing medium is prevented and dot quality is improved.

Compositions suitable for use as phase change ink compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

U.S. Pat. No. 5,780,528 (Titterington et al.), the disclosure of which is totally incorporated herein by reference, discloses isocyanate-derived colored resins made by reacting an alcohol and/or amine, an isocyanate, and a nucleophilic molecule containing a chromogen. The isocyanate-derived colored resins are useful as colorant materials in phase change ink compositions.

U.S. Pat. No. 5,919,839 (Titterington et al.), the disclosure of which is totally incorporated herein by reference, discloses colored waxes made by reacting selected nucleophiles, including alcohol containing colorants, with an isocyanate. A phase change ink is made by blending the colored wax with a clear ink carrier composition. The clear ink carrier composition can be a fatty amide-based material and/or a combination of isocyanate-derived resins in which the order of addition of the isocyanate and the different nucleophiles can tailor the distribution of di-urethane, mixed urethane/urea, and/or di-urea molecules in the final resin product. The colored wax materials are useful as ingredients with phase change ink carrier compositions to make phase change ink jet inks.

U.S. Pat. No. 6,015,847 (Titterington et al.), the disclosure of which is totally incorporated herein by reference, discloses a phase change ink composition comprising a phase change carrier composition, at least one compatible phase change magenta colorant material, and at least one organic sulfonic acid compound. The sulfonic acid stabilizes the magenta dye.

While known compositions and processes are suitable for their intended purposes, a need remains for improved phase change inks. In addition, a need remains for improved cyan phase change inks. Further, a need remains for cyan phase change inks with improved thermal stability. Additionally, a need remains for cyan phase change inks with reduced image defects. There is also a need for cyan phase change inks that do not become discolored or lose color over time in a phase change ink jet printer. In addition, there is a need for cyan phase change inks containing colorants of high purity. Further, there is a need for cyan phase change inks with excellent spectral strengths. Additionally, there is a need for cyan phase change inks with substantially transparent colorants. A need also remains for cyan phase change inks with desirable electrical conductivity values. In addition, a need remains for cyan phase change inks that exhibit good fold durability on printed media.

SUMMARY OF THE INVENTION

The present invention is directed to a phase change ink composition comprising (a) a phase change carrier, (b) a cyan colored resin or wax comprising the reaction product of (i) a cyan colorant having at least one functional group selected from (A) hydroxyl groups, (B) primary or secondary amino groups, (C) mercapto groups, or (D) mixtures thereof, and (ii) an isocyanate, and (c) an organic acid selected from (i) organic sulfonic acids, (ii) organic phosphinic acids, (iii) organic phosphonic acids, or (iv) mixtures thereof.

BRIEF DESCRIPTION OF THE DRAWING

The FIGURE is a graphical representation of data obtained as described in the Examples.

DETAILED DESCRIPTION OF THE INVENTION

The present invention is directed to a phase change ink composition comprising (a) a phase change carrier, (b) a cyan colored resin or wax comprising the reaction product of (i) a cyan colorant having at least one functional group selected from (A) hydroxyl groups, (B) primary or secondary amino groups, (C) mercapto groups, or (D) mixtures thereof, and (ii) an isocyanate, and (c) an organic acid selected from (i) organic sulfonic acids, (ii) organic phosphinic acids, (iii) organic phosphonic acids, or (iv) mixtures thereof.

Phase change inks of the present invention contain a phase change carrier system or composition. The phase change carrier composition is typically designed for use in either a direct printing mode or an indirect or offset printing transfer system.

In the direct printing mode, the phase change carrier composition in specific embodiments contains one or more materials that enable the phase change ink (1) to be applied in a thin film of uniform thickness on the final recording substrate (such as paper, transparency material, or the like) when cooled to ambient temperature after printing directly to the recording substrate, (2) to be ductile while retaining sufficient flexibility so that the applied image on the substrate will not fracture upon bending, and (3) to possess a high degree of lightness, chroma, transparency, and thermal stability.

In an offset printing transfer or indirect printing mode, the phase change carrier composition in specific embodiments exhibits not only the characteristics desirable for direct printing mode inks, but also certain fluidic and mechanical properties desirable for use in such a system, as described in, for example, U.S. Pat. No. 5,389,958 the disclosure of which is totally incorporated herein by reference.

Any desired or effective carrier composition can be used. Examples of suitable ink carrier materials include fatty amides, such as monoamides, tetraamides, mixtures thereof, and the like. Specific examples of suitable fatty amide ink carrier materials include stearyl stearamide, a dimer acid based tetra-amide that is the reaction product of a dimer acid, ethylene diamine, and stearic acid, and the like, as well as mixtures thereof. Further information on fatty amide carrier materials is disclosed in, for example, U.S. Pat. Nos. 4,889,560, 4,889,761, 5,194,638, 4,830,671, and 5,372,852, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on fatty amide carrier materials is disclosed in, for example, U.S. Pat. Nos. 5,750,604, 5,780,528, 5,782,966, 5,783,658, 5,827,918, 5,830,942, and 5,919,839, the disclosures of each of which are totally incorporated herein by reference.

Mixtures of fatty amide materials and isocyanate-derived materials can also be employed as the ink carrier composition for inks of the present invention.

Additional suitable phase change ink carrier materials for the present invention include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

The ink carrier is present in the phase change ink of the present invention in any desired or effective amount, typically at least about 0.1 percent by weight of the ink, preferably at least about 50 percent by weight of the ink, and more preferably at least about 90 percent by weight of the ink, and typically no more than about 99 percent by weight of the ink, preferably no more than about 98 percent by weight of the ink, and more preferably no more than about 95 percent by weight of the ink, although the amount can be outside of these ranges.

The phase change inks of the present invention also contain a cyan colored resin or wax comprising the reaction product of a cyan colorant having at least one functional group selected from hydroxyl groups, primary or secondary amino groups, mercapto groups, or mixtures thereof, and an isocyanate. Examples of suitable hydroxyl-, amino-, or mercapto-substituted cyan colorants include those disclosed in, for example, U.S. Pat. Nos. 3,157,633, 3,927,044, 3,994, 835, 4,102,644, 4,113,721, 4,132,840, 4,137,243, 4,170,564, 4,284,729, 4,507,407, 4,640,690, 4,732,570, 4,751,254, 4,751,254, 4,761,502, 4,775,748, 4,812,141, 4,846,846, 4,871,371, 4,912,203, 4,978,362, 5,043,013, 5,059,244, 5,149,800, 5,177,200, 5,270,363, 5,290,921, and 5,731,398, the disclosures of each of which are totally incorporated herein by reference. Hydroxyl-containing colorants from the classes of Color Index (C.I.) Solvent Dyes, Disperse Dyes, modified Acid and Direct Dyes, Basic Dyes, Sulphur Dyes, Vat Dyes, and the like can also be used.

In one specific embodiment, the hydroxyl, amino, and/or mercapto group or groups on the cyan colorant are terminal groups to polyoxyalkylene groups or chains, such as polyethylene oxide groups or chains, polypropylene oxide groups or chains, polyethylene oxide/polypropylene oxide groups or chains, or the like. The poly(oxyalkylene) groups each typically (although not necessarily) comprise from 1 to about 200 repeat alkylene oxide units, preferably from about 3 to about 100 repeat alkylene oxide units, and more preferably from about 5 to about 50 repeat alkylene oxide units, although the number of repeat alkylene oxide units can be outside of these ranges. Suitable alkylene oxides include ethylene oxide, propylene oxide, butylene oxide, and the like. Branching of the polyalkylene oxide can be accomplished by initially including glycidol or chloropropane diol groups in the sequence, thereby including multiple hydroxyl sites, as disclosed in, for example, U.S. Pat. No. 5,290,921, the disclosure of which is totally incorporated herein by reference. Minor amounts of compatible monomers can also be included in the polyalkylene oxide group. The polyalkylene oxide typically has a molecular weight of from about 88 to about 5,000, and preferably from about 250 to about 3,000, although the molecular weight can be outside of these ranges. Analogous nitrogen-containing groups can also be used instead of polyalkylene oxide groups, such as aziridines, including those of the formulae —$(C_2H_4NH)_n$—, —$(C_3H_6NH)_n$—, —$(C_4H_8NH)_n$—, chains containing random or block mixtures of two or more of these repeat units, and the like, wherein n typically is from 1 to about 200, preferably from about 3 to about 100, and more preferably from about 5 to about 50, although the value of n can be outside of these ranges, said aziridines having terminal hydroxyl, amino, and/or mercapto groups.

In this specific embodiment, the polyoxyalkylene-substituted or polyaziridine-substituted cyan colorant can be any desired or suitable colorant, including (but not limited to) triphenylmethane colorants, azo colorants, phthalocyanine colorants, anthraquinone colorants, and the like, as well as mixtures thereof.

Specific examples of suitable triphenyl methane colorants include (but are not limited to) those of the general formula

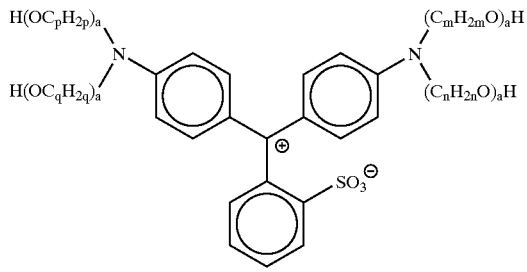

wherein each m, n, p, and q, independently of the others, is an integer representing the number of carbon atoms in a particular repeat oxyalkylene unit, and typically is 2, 3, or 4, although the values of m, n, p, and q can be outside of this range, and each a, independently of the others, is an integer representing the number of repeat alkylene oxide units, and typically is from about 2 to about 200, although the values of a can be outside of this range. Included within this general formula are triphenyl methane colorants of the formula

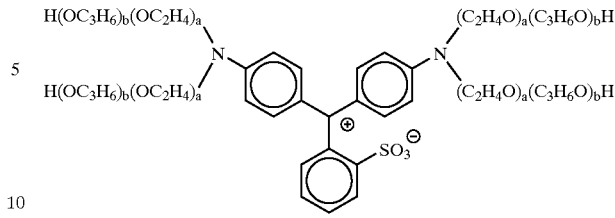

wherein each a and b, independently of the others, is an integer representing the number of repeat alkylene oxide units, and typically is from about 2 to about 10, although the values of a and b can be outside of this range, and triphenyl methane colorants of the formula

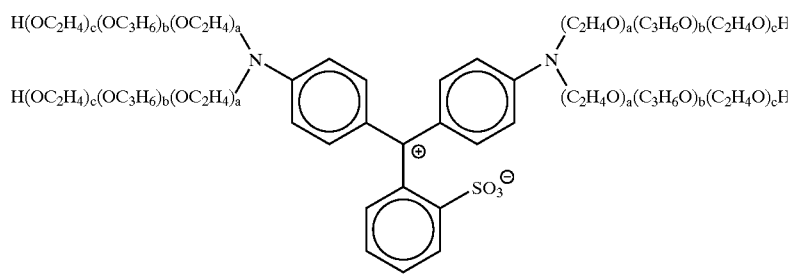

wherein each a, b, and c, independently of the others, is an integer representing the number of repeat alkylene oxide units, and wherein typically each a is from 1 to about 2, each b is from about 3 to about 10, and each c is from 0 to about 5, although the values of a, b, and c can be outside of these ranges, both of which can be prepared as described in, for example, U.S. Pat. No. 4,871,371, the disclosure of which is totally incorporated herein by reference.

The hydroxyl-, amino-, or mercapto-substituted cyan colorant is reacted with an isocyanate to form a cyan colored resin or wax suitable for the inks of the present invention. Examples of suitable isocyanates include monoisocyanates, diisocyanates, triisocyanates, copolymers of a diisocyanate, copolymers of a triisocyanate, polyisocyanates (having more than three isocyanate functional groups), and the like, as well as mixtures thereof. Examples of monoisocyanates include octadecylisocyanate; hexadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like, as well as mixtures thereof. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate (H12MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyidiisocyanate; 3,3'-dimethyl-4,4'-bimethyl-4,4'-biphenyldiisocyanate; phenylene diisocyanate; 4,4'- biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like, as well as mixtures thereof. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like, as well as mixtures thereof. Examples of higher isocyanate functionalities include copolymers of TDI/HDI, and the like, and MDI oligomers, as well as mixtures thereof.

Any suitable reaction condition for making urethane or urea compounds by condensing alcohols, amines, or mercaptans with isocyanates can be used to prepare the cyan colored resin or wax. Typically (although not necessarily), the reaction is carried out at elevated temperatures (for example, from about 60 to about 160° C. in the presence of a urethane reaction catalyst, such as dibutyl tindilaurate, bismuth tris-neodecanoate, cobalt benzoate, lithium acetate, stannous octoate, triethylamine, or the like. In a specific embodiment, the reaction conditions are conducted in an inert atmosphere, such as argon or nitrogen gas or other suitable gases, to prevent oxidizing or yellowing of the reaction products and to prevent undesirable side reactions. The mole ratio of reactants is adjusted so that the isocyanate functionalities are completely consumed in the reaction with a slight molar excess of cyan colorant typically remaining. The reactants can be added together in any order and/or added to the reaction as physical mixtures. If desired, reaction conditions and the order of the addition of reactants can be controlled for several reasons, such as to provide a controlled exothermic reaction, to tailor the distribution of diurethane molecules in the cyan colored resin or wax, or the like. When doing these adjustments, the different reactivities to isocyanates of alcohols versus amines can be employed, as well as the different reactivities of the two separate isocyanate groups on IPDI. See, for example, J. H. Saunders and K. C. Frisch's "Polyurethanes Part I, Chemistry" published by Interscience of New York, N.Y. in 1962 and Olin Chemicals' LUXATE® IM isophorone diisocyanate technical product information sheet, which provide further explanation of this chemistry.

Further information regarding colored urethane and urea resins and waxes is disclosed in, for example, U.S. Pat. Nos. 5,780,528 and 5,919,839, the disclosures of each of which are totally incorporated herein by reference.

The cyan colored resin or wax is present in the ink in any desired or effective amount to obtain the desired color or hue, typically at least about 0.1 percent by weight of the ink, preferably at least about 1 percent by weight of the ink, and more preferably at least about 5 percent by weight of the ink, and typically no more than about 99 percent by weight of the ink, preferably no more than about 50 percent by weight of the ink, and more preferably no more than about 15 percent by weight of the ink, although the amount can be outside of these ranges.

The phase change inks of the present invention also contain an organic acid. This material can be any organic compound having one or more sulfonic acid, phosphonic acid, and/or phosphinic acid groups thereon. Examples of suitable organic acids include those of the general formula

R—X wherein X is $SO_3H$, $PO_2H_2$, or $PO_3H_2$, R is an organic moiety, including (but not limited to) an alkyl group (including linear, branched, cyclic, saturated, unsaturated, and substituted alkyl groups, and wherein hetero atoms, such as oxygen, sulfur, nitrogen, silicon, or the like, can be placed between the carbon atoms in the alkyl group), typically with from 1 to about 100 carbon atoms, and preferably with from about 6 to about 50 carbon atoms, although the number of carbon atoms can be outside of this range, an aryl group (including substituted aryl groups), typically with from 5 to about 15 carbon atoms, and preferably with from about 6 to about 10 carbon atoms, although the number of carbon atoms can be outside of this range, an arylalkyl group (including substituted arylalkyl groups), typically with from 6 to about 100 carbon atoms, and preferably with from about 18 to about 50 carbon atoms, although the number of carbon atoms can be outside of this range, an alkylaryl group (including substituted alkylaryl groups), typically with from 6 to about 100 carbon atoms, and preferably with from about 18 to about 50 carbon atoms, although the number of carbon atoms can be outside of this range, an alkoxy group (including substituted alkoxy groups), typically with from 1 to about 50 carbon atoms, and preferably with from about 2 to about 18 carbon atoms, although the number of carbon atoms can be outside of this range, although the number of carbon atoms can be outside of this range, a polyalkyleneoxy group (including substituted polyalkyleneoxy groups), typically with from 1 to about 100 repeat alkyleneoxy units, and preferably with from about 2 to about 20 repeat alkyleneoxy units, although the number of repeat alkyleneoxy units can be outside of these ranges, an aryloxy group (including substituted aryloxy groups), typically with from 6 to about 25 carbon atoms, and preferably with from about 8 to about 12 carbon atoms, although the number of carbon atoms can be outside of this range, an arylalkyloxy group (including substituted arylalkyloxy groups), typically with from 6 to about 25 carbon atoms, and preferably with from about 8 to about 12 carbon atoms, although the number of carbon atoms can be outside of this range, an alkylaryloxy group (including substituted alkylaryloxy groups), typically with from 6 to about 25 carbon atoms, and preferably with from about 8 to about 12 carbon atoms, although the number of carbon atoms can be outside of this range, a heterocyclic group (including substituted heterocyclic groups), typically with from 1 to about 25 carbon atoms, and preferably with from about 5 to about 12 carbon atoms, typically with from about 4 to about 25 ring atoms, and preferably with from about 5 to about 20 ring atoms, although the number of carbon atoms and the number of ring atoms can be outside of these ranges, wherein the heteroatoms in the heterocyclic groups can be (but are not limited to) nitrogen, oxygen, sulfur, silicon, and the like, as well as mixtures thereof, silyl groups, siloxy groups, or any other common organic functional group, wherein the substituents on the substituted alkyl, aryl, alkylaryl, arylalkyl, alkoxy, aryloxy, aryl alkyloxy, alkylaryloxy, and heterocyclic groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, mixtures thereof, and the like, as well as mixtures thereof, and wherein two or more substituents can be joined together to form a ring.

Examples of suitable organic acids include benzene sulfonic acid and alkyl benzene sulfonic acids, including (but not limited to) those of the general formula

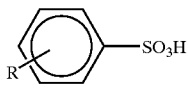

wherein R is a hydrogen atom or an alkyl group, typically with from about 6 to about 60 carbon atoms, and preferably from about 7 to about 20 carbon atoms, although the number of carbon atoms can be outside of these ranges, benzene phosphinic acid and alkyl benzene phosphinic acids, including (but not limited to) those of the general formula

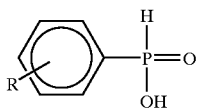

wherein R is a hydrogen atom or an alkyl group, typically with from about 6 to about 60 carbon atoms, and preferably from about 7 to about 20 carbon atoms, although the number of carbon atoms can be outside of these ranges, benzene phosphonic acid and alkyl benzene phosphonic acids, including (but not limited to) those of the general formula

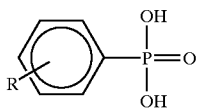

wherein R is a hydrogen atom or an alkyl group, typically with from about 6 to about 60 carbon atoms, and preferably from about 7 to about 20 carbon atoms, although the number of carbon atoms can be outside of these ranges, and the like.

Specific examples of suitable organic acids include benzene sulfonic acid, p-toluene sulfonic acid, dodecylbenzene sulfonic acid, ethylbenzene sulfonic acid, naphthalene sulfonic acid, anthraquinone sulfonic acid, anthraquinone disulfonic acid, camphor sulfonic acid, butyl phosphonic acid, phenyl phosphinic acid, phenyl phosphonic acid, p-toluene phosphinic acid, p-toluene phosphonic acid, and the like, as well as mixtures thereof.

The organic acid is present in the ink composition of the present invention in any desired or effective amount, typically at least about 0.1 percent by weight of the ink, preferably at least about 0.5 percent by weight of the ink, and more preferably at least about 3 percent by weight of the ink, and typically no more than about 15 percent by weight of the ink, preferably no more than about 10 percent by weight of the ink, and more preferably no more than about 5 percent by weight of the ink, although the amount can be outside of these ranges.

The ink compositions of the present invention can also optionally contain a polyethylene wax. These waxes are often used when an isocyanate-based resin is included in the ink carrier. Suitable polyethylene waxes include (but are not limited to) those with number average molecular weight values of typically at least about 500, preferably at least about 700, and more preferably at least about 800, and typically no more than about 5,000, preferably no more than about 2,000, and more preferably no more than about 1,200, although the number average molecular weight value can be outside of these ranges. When present, the optional polyethylene wax is present in the ink in any desired or effective amount, typically at least about 1 percent by weight of the ink, preferably at least about 5 percent by weight of the ink, and more preferably at least about 40 percent by weight of the ink, and typically no more than about 99 percent by weight of the ink, preferably no more than about 70 percent by weight of the ink, and more preferably no more than about 60 percent by weight of the ink, although the amount can be outside of these ranges.

The inks of the present invention can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, NAUGUARD® 512, and NAUGUARD® 445, commercially available from Uniroyal Chemical Company, Middlebury, Conn., IRGANOX® 1010, commercially available from Ciba Geigy, and the like. When present, the optional antioxidant is present in the ink in any desired or effective amount, typically at least about 0.01 percent by weight of the ink, preferably at least about 0.1 percent by weight of the ink, and more preferably at least about 1 percent by weight of the ink, and typically no more than about 20 percent by weight of the ink, preferably no more than about 5 percent by weight of the ink, and more preferably no more than about 3 percent by weight of the ink, although the amount can be outside of these ranges.

The inks of the present invention can also optionally contain a viscosity modifier. Examples of suitable viscosity modifiers include aliphatic ketones, such as stearone, and the like. When present, the optional viscosity modifier is present in the ink in any desired or effective amount, typically at least about 0.1 percent by weight of the ink, preferably at least about 1 percent by weight of the ink, and more preferably at least about 10 percent by weight of the ink, and typically no more than about 99 percent by weight of the ink, preferably no more than about 30 percent by weight of the ink, and more preferably no more than about 15 percent by weight of the ink, although the amount can be outside of these ranges.

Other optional additives to the inks include clarifiers, such as UNION CAMP® X37-523-235 (commercially available from Union Camp), in an amount typically of at least about 0.01 percent by weight of the ink, preferably at least about 0.1 percent by weight of the ink, and more preferably at least about 5 percent by weight of the ink, and typically no more than about 99 percent by weight of the ink, preferably no more than about 50 percent by weight of the ink, and more preferably no more than about 10 percent by weight of the ink, although the amount can be outside of these ranges, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in an amount typically of at least about 0.1 percent by weight of the ink, preferably at least about 5 percent by weight of the ink, and more preferably at least about 10 percent by weight of the ink, and typically no more than about 99 percent by weight of the ink, preferably no more than about 75 percent by weight of the ink, and more preferably no more than about 50 percent by weight of the ink, although the amount can be outside of these range, adhesives, such as VERSA-MID® 757, 759, or 744 (commercially available from Henkel), in an amount typically of at least about 0.1 percent by weight of the ink, preferably at least about 1 percent by weight of the ink, and more preferably at least about 5 percent by weight of the ink, and typically no more than about 99 percent by weight of the ink, preferably no more than about 50 percent by weight of the ink, and more preferably no more than about 10 percent by weight of the ink, although the amount can be outside of this range, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in an amount typically of at least about 0.1 percent by weight of the ink, preferably at least about 1 percent by weight of the ink, and more preferably at least about 2 percent by weight of the ink, and typically no more than about 50 percent by weight of the ink, preferably no more than about 30 percent by weight of the ink, and more preferably no more than about 10 percent by weight of the ink, although the amount can be outside of these ranges, and the like.

The ink compositions of the present invention typically have melting points no lower than about 50° C., preferably no lower than about 70° C., and more preferably no lower than about 80° C., and typically have melting points no higher than about 160° C., preferably no higher than about 140° C., and more preferably no higher than about 100° C., although the melting point can be outside of these ranges.

The ink compositions of the present invention generally have melt viscosities at the jetting temperature (typically no lower than about 75° C., preferably no lower than about 100° C., and more preferably no lower than about 120° C., and typically no higher than about 180° C., preferably no higher than about 150° C., and more preferably no higher than about 130° C., although the jetting temperature can be outside of these ranges) typically of no more than about 30 centipoise, preferably no more than about 20 centipoise, and even more preferably no more than about 15 centipoise, and typically of no less than about 2 centipoise, preferably no less than about 5 centipoise, and even more preferably no less than about 7 centipoise, although the melt viscosity can be outside of these ranges. Since image hardness tend to drop with lower viscosities, it is preferred that the viscosity be as low as possible while still retaining the desired degree of image hardness.

The ink compositions of the present invention can be prepared by any desired or suitable method. For example, the ink ingredients can be mixed together, followed by heating, typically to a temperature of from about 100 to about 140° C., although the temperature can be outside of this range, and stirring until a homogeneous ink composition is obtained, followed by cooling the ink to ambient temperature (typically from about 20 to about 25° C.). The inks of the present invention are solid at ambient temperature.

The inks of the present invention can be employed in apparatus for direct printing ink jet processes and in indirect (offset) printing ink jet applications. Another embodiment of the present invention is directed to a process which comprises incorporating an ink of the present invention into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment of the present invention is directed to a process which comprises incorporating an ink of the present invention into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks of the present invention can also be employed in other hot melt printing processes, such as hot melt acoustic ink jet printing, hot melt thermal ink jet printing, hot melt continuous stream or deflection ink jet printing, or the like. Phase change inks of the present invention can also be used in printing processes other than hot melt ink jet printing processes, such as hot melt gravure printing, hot melt medical imaging printing, or the like.

Any suitable substrate or recording sheet can be employed, including plain papers such as Xerox® 4024 papers, Xerox® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like.

While not being limited to any particular theory, it is believed that the presence of the organic acid in the ink decreases the rate at which the cyan ink decolors (loses cyan color, or pales) as a result of thermal aging when the ink is inside the printer over long periods of time. The decoloration otherwise can occur in the cyan ink prior to printing, and when a cyan ink that has been present in a hot melt or phase change ink jet printer over a period of time loses color, the resulting prints made with this ink are also undesirably pale or lacking in the desired hue or intensity. This decoloration problem sometimes observed with cyan inks is to be distinguished from the difficulties sometimes observed with magenta inks, as disclosed in U.S. Pat. No. 6,015,847. The magenta inks disclosed therein exhibited problems with blooming, or color increase, subsequent to printing of the magenta ink onto a substrate. The presence of the acid in these magenta inks prevented increase or change in the color, hue, or intensity of the ink image on the printed substrate.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

In a stainless steel beaker were combined 481.2 grams of polyethylene wax (PE 655, obtained from Baker Petrolite, Tulsa, Okla., of the formula $CH(CH)_{50}CH$), 160 grams of a tetraamide resin (as prepared in Example 1 of U.S. Pat. No. 6,174,937, the disclosure of which is totally incorporated herein by reference), 121.5 grams of a plasticizer prepared as disclosed in Example 1 of U.S. Pat. No. 5,782,966, the disclosure of which is totally incorporated herein by reference, 121.6 grams of stearyl stearamide wax (KEMAMIDE® S-180, obtained from Crompton Corporation, Greenwich, Conn.), 50.7 grams of a resin prepared as disclosed in Example 4 of Copending application U.S. Ser. No. 09/400,127, filed Sep. 20, 1999, now U.S. Pat. No. 6,309,453 the disclosure of which is totally incorporated herein by reference, and 2 grams of NAUGUARD® 445 antioxidant (obtained from Uniroyal Chemical Co., Middlebury, Conn.). The mixture of materials was heated for about 3 hours at 125° C. in an oven, followed by stirring in a temperature controlled heating mantle at 125° C. for one half hour. To this molten ink base was then added 53.0 grams of a cyan colored resin or wax prepared as disclosed in Example 4 of U.S. Pat. No. 5,919,839, the disclosure of which is totally incorporated herein by reference, and 10.0 grams of dodecyl benzene sulfonic acid. The resulting cyan ink was stirred for an additional 2 hours at 125° C. in the heating mantle, followed by filtering the ink through a heated (125° C.) Mott apparatus using a 2 micron filter at 5 pounds per square inch. The ink was then poured into molds and allowed to solidify to form ink sticks. The final cyan ink was characterized by a viscosity at 140° C. of 10.63 centipoise, measured with a BOHLIN viscometer. The spectral strength of the ink was 1,450 milliliters·Absorbance Units per gram at a lambda$_{max}$ of 627 nanometers as measured by dilution of 90 milligrams of ink in 250 milliliters of n-butanol using a PERKIN-ELMER LAMBDA 2S UV/visible spectrophotometer.

The cyan ink thus prepared was placed in a XEROX® PHASER 860 printer, which uses a printing process wherein the ink is first jetted in an imagewise pattern onto an intermediate transfer member followed by transfer of the imagewise pattern from the intermediate transfer member to a final recording substrate. The ink was printed with a printhead temperature of 138° C. and an intermediate transfer drum temperature of 64° C. with HAMMERMILL LASERPRINT® paper (obtained from International Paper, Memphis, Tenn.). The cyan ink printed on paper under these conditions had a cyan color very similar to, but slightly darker than, the cyan color of the control ink prepared as described below in Comparative Example A. The ink flow in the printer of the ink of Example I was also improved compared to that of the ink of Comparative Example A. The printed page made with the ink of Example I had better fold durability compared to printed pages made with the ink of Comparative Example A. The ink of Example I also did not lose a substantial degree of color after several hundred hours of residence in the printer; a page printed after several hundred hours still exhibited a uniformly rich cyan color and was very similar to that produced when the printer was first started up with this ink.

Comparative Example A

For comparison purposes, a cyan ink composition was prepared as described in Example I except that the ink contained no dodecyl benzene sulfonic acid. The control cyan ink thus prepared was placed in XEROX® PHASER 860 printers and used to print by the process described in Example I. The printers were then used to print a short series of images (hereinafter called a "print suite") followed by a print of uniform cyan color filling 100 percent of the area of the printed page (hereafter referred to as "cyan solid fill"). One print suite was printed every eight hours to allow for longer residence time for the ink inside the printer. The color value ($\hat{E}$) across the cyan solid fill was measured with a GRETAG SPM100-II spectrophotometer obtained from GretagMacbeth LLC, New Windsor, N.Y. The change in the color value with time of the printed cyan solid fill page was computed in terms of page average delta $\hat{E}$ (or $\Delta\hat{E}_{avg}$) as follows.

At time of start (time t=0) the color value $\hat{E}_0$ at several predetermined locations on the cyan solid fill page was measured. After several hours and after printing several print suites (time t=t), the color value $\hat{E}_t$ at the same predetermined locations on the cyan solid fill page was again measured. The difference in color value ($\hat{E}_0 - \hat{E}_t$) is $\Delta\hat{E}$ for a given location. The average of this difference for all of the predetermined locations on the cyan solid fill page was reported as the page average delta $\hat{E}$ ($\Delta\hat{E}_{avg}$).

The decoloration between printed solid fill pages is given by the increase in $\Delta\hat{E}_{avg}$. Ideally, $\Delta\hat{E}_{avg}$ should remain close to zero regardless of how long the ink thermally ages in the printer; in practice, some degradation often occurs, and a color difference of 20.0 units or below has been determined to be generally acceptable for the printer. Higher $\Delta\hat{E}_{avg}$ values correspond to higher degrees of unacceptability. The decoloration over time when using the control ink of Comparative Example A in the printer is shown in the FIGURE. Twelve different PHASER® 860 printers were used, and four different lots of ink (W, X, Y, and Z) prepared as described in Comparative Example A were used. From the FIGURE, it can be seen that the decoloration for the control inks of Comparative Example A progressively increases with time well beyond the level of acceptability.

EXAMPLE II

To demonstrate the effectiveness of the ink of Example I in reclaiming the color loss on the printed page, sticks of the ink of Example I were placed behind sticks of the control ink of Comparative Example A in the printers that had been used in Comparative Example A at a time when the control ink had already reached a severely undesirable $\Delta\hat{E}_{avg}$. As shown in the FIGURE, the sticks of the ink of Example I were introduced at about 920 hours. It was believed that the ink of Example I would melt, flow, and mix with the thermally aged control ink of Comparative Example A and slowly but surely bring down $\Delta\hat{E}_{avg}$ because of the presence of the organic acid in the ink formulation of Example I, even though the mixture of inks continued to age thermally. The decrease in $\Delta\hat{E}_{avg}$ in the FIGURE after the ink of Example I had been introduced into the printers demonstrates the reduction in cyan ink decoloration obtainable with the inks according to the present invention.

To demonstrate further the effectiveness of the cyan inks according to the present invention in reducing or preventing the thermal aging and resulting decoloration of the cyan ink in the printer, the ink of Example I was introduced from start in several printers. The typical $\Delta\hat{E}_{avg}$ for the control ink of Comparative Example A and the ink of Example I averaged from data on several printers is given in the table below.

| Hours at Ready | $\Delta \hat{E}_{avg}$ for Ink of Example I | $\Delta \hat{E}_{avg}$ for Ink of Comparative Example A |
| --- | --- | --- |
| 100 | 9.0 | 5.0 |
| 200 | 10.0 | 10.0 |
| 300 | 13.0 | 18.0 |
| 400 | 15.0 | 22.0 |
| 500 | 17.0 | 26.0 |

The data in the table show that the control ink degrades in color much more quickly than the ink according to the present invention.

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A phase change ink composition comprising (a) a phase change carrier, (b) a cyan colored resin or wax comprising the reaction product of (i) a cyan colorant having at least one functional group selected from (A) hydroxyl groups, (B) primary or secondary amino groups, (C) mercapto groups, or (D) mixtures thereof, and (ii) an isocyanate, and (c) an organic acid selected from (i) organic sulfonic acids, (ii) organic phosphinic acids, (iii) organic phosphonic acids, or (iv) mixtures thereof.

2. An ink composition according to claim 1 wherein the carrier is present in the ink in an amount of at least about 0.1 percent by weight of the ink, and wherein the carrier is present in the ink in an amount of no more than about 99 percent by weight of the ink.

3. An ink composition according to claim 1 wherein the carrier comprises at least one fatty amide.

4. An ink composition according to claim 1 wherein the carrier comprises at least one isocyanate-derived resin or wax.

5. An ink composition according to claim 1 wherein the carrier comprises a mixture of at least one fatty amide and at least one isocyanate-derived resin or wax.

6. An ink composition according to claim 1 further containing a polyethylene wax.

7. An ink composition according to claim 6 wherein the polyethylene wax is present in the ink in an amount of at least about 1 percent by weight of the ink, and wherein the polyethylene wax is present in the ink in an amount of no more than about 99 percent by weight of the ink.

8. An ink composition according to claim 1 wherein the cyan colorant has hydroxyl, amino, or mercapto groups that are terminal groups to polyoxyalkylene groups or chains.

9. An ink composition according to claim 1 wherein the cyan colorant comprises a triphenylmethane colorant.

10. An ink composition according to claim 1 wherein the cyan colorant comprises a triphenyl methane colorant of the general formula

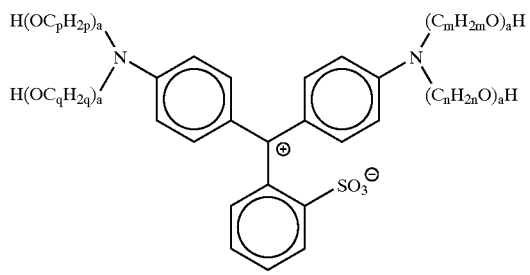

wherein each m, n, p, and q, independently of the others, is an integer representing the number of carbon atoms in a particular repeat oxyalkylene unit, and each a, independently of the others, is an integer representing the number of repeat alkylene oxide units.

11. An ink composition according to claim 10 wherein each m, n, p, and q, independently of the others, is 2, 3, or 4, and each a, independently of the others, is from about 2 to about 200.

12. An ink composition according to claim 10 wherein the cyan colorant comprises a triphenyl methane colorant of the formula

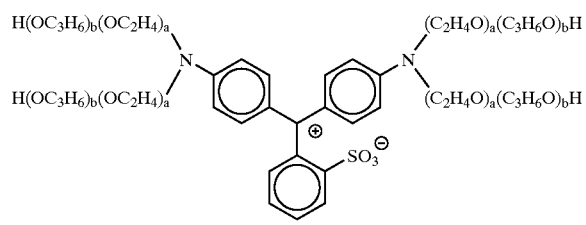

wherein each a and b, independently of the others, is an integer representing the number of repeat alkylene oxide units.

13. An ink composition according to claim 12 wherein each a and b, independently of the others, is from about 2 to about 10.

14. An ink composition according to claim 10 wherein the cyan colorant comprises a triphenyl methane colorant of the formula

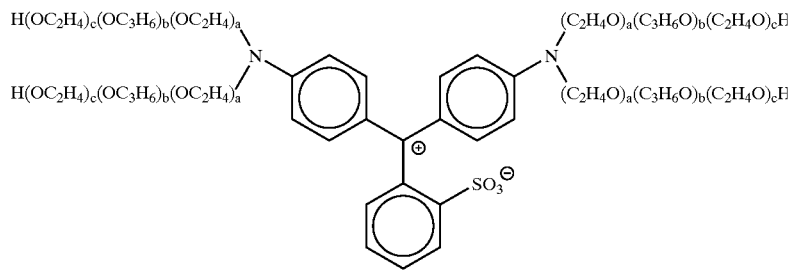

wherein each a, b, and c, independently of the others, is an integer representing the number of repeat alkylene oxide units.

15. An ink composition according to claim 14 wherein each a is from 1 to about 2, each b is from about 3 to about 10, and each c is from 0 to about 5.

16. An ink composition according to claim 1 wherein the isocyanate is a monoisocyanate.

17. An ink composition according to claim 16 wherein the monoisocyanate is octadecylisocyanate; hexadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyante; or mixtures thereof.

18. An ink composition according to claim 1 wherein the isocyanate is a diisocyanate.

19. An ink composition according to claim 18 wherein the diisocyanate is isophorone diisocyanate; toluene diisocyanate; diphenylmethane-4,4'-diisocyanate; hydrogenated diphenylmethane-4,4'-diisocyanate; tetra-methyl xylene diisocyanate; hexamethylene-1,6-diisocyanate; hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; cyclohexylene diisocyanate or an isomer thereof; a uretidione dimer of hexamethylene-1,6-diisocyanate; or mixtures thereof.

20. An ink composition according to claim 1 wherein the isocyanate is a triisocyanate or a polyisocyanate.

21. An ink composition according to claim 1 wherein the cyan colored resin or wax is present in the ink in an amount of at least about 0.1 percent by weight of the ink.

22. An ink composition according to claim 1 wherein the cyan colored resin or wax is present in the ink in an amount of at least about 1 percent by weight of the ink, and wherein the cyan colored resin or wax is present in the ink in an amount of no more than about 50 percent by weight of the ink.

23. An ink composition according to claim 1 wherein the organic acid is of the general formula

R—X wherein X is $SO_3H$, $PO_2H_2$, or $PO_3H_2$ and R is an organic moiety.

24. An ink composition according to claim 23 wherein R is an alkyl group, an aryl group, an arylalkyl group, an alkylaryl group, an alkoxy group, a polyalkyleneoxy group, an aryloxy group, an arylalkyloxy group, an alkylaryloxy group, or a heterocyclic group.

25. An ink composition according to claim 1 wherein the organic acid is (a) a benzene sulfonic acid of the formula

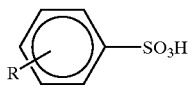

wherein R is a hydrogen atom or an alkyl group, (b) a benzene phosphinic acid of the formula

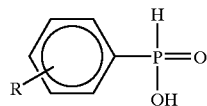

wherein R is a hydrogen atom or an alkyl group, or (c) a benzene phosphonic acid of the formula

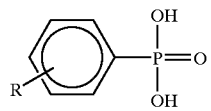

wherein R is a hydrogen atom or an alkyl group.

26. An ink composition according to claim 25 wherein R has from 6 to about 60 carbon atoms.

27. An ink composition according to claim 1 wherein the organic acid is benzene sulfonic acid, p-toluene sulfonic acid, dodecylbenzene sulfonic acid, ethylbenzene sulfonic acid, naphthalene sulfonic acid, anthraquinone sulfonic acid, anthraquinone disulfonic acid, camphor sulfonic acid, butyl phosphonic acid, phenyl phosphinic acid, phenyl phosphonic acid, p-toluene phosphinic acid, p-toluene phosphonic acid, or mixtures thereof.

28. An ink composition according to claim 1 wherein the organic acid is present in the ink in an amount of at least about 0.1 percent by weight of the ink.

29. An ink composition according to claim 1 wherein the organic acid is present in the ink in an amount of no more than about 15 percent by weight of the ink.

30. An ink composition according to claim 1 having a melting point of no lower than about 50° C. and having a melting point of no higher than about 160° C.

31. An ink composition according to claim 1 having a viscosity at a phase change ink jetting temperature of no more than about 30 centipoise.

32. A process which comprises (1) incorporating into an ink jet printing apparatus a phase change ink composition comprising (a) a phase change carrier, (b) a cyan colored resin or wax comprising the reaction product of (i) a cyan colorant having at least one functional group selected from (A) hydroxyl groups, (B) primary or secondary amino groups, (C) mercapto groups, or (D) mixtures thereof, and (ii) an isocyanate, and (c) an organic acid selected from (i) organic sulfonic acids, (ii) organic phosphinic acids, (iii) organic phosphonic acids, or (iv) mixtures thereof; (2) melting the ink; and (3) causing droplets of the melted ink to be ejected in an imagewise pattern onto a substrate.

33. A process according to claim 32 wherein the substrate is a final recording sheet and droplets of the melted ink are ejected in an imagewise pattern directly onto the final recording sheet.

34. A process according to claim 32 wherein the substrate is an intermediate transfer member and droplets of the melted ink are ejected in an imagewise pattern onto the intermediate transfer member followed by transfer of the imagewise pattern from the intermediate transfer member to a final recording sheet.

35. A process according to claim 34 wherein the intermediate transfer member is heated to a temperature above that of the final recording sheet and below that of the melted ink in the printing apparatus.

36. A process according to claim 32 wherein the printing apparatus employs a piezoelectric ink jet process, wherein droplets of the ink are caused to be ejected in imagewise pattern by oscillations of piezoelectric vibrating elements.

* * * * *